(12) United States Patent
Servel (10) Patent No.: US 9,557,153 B2
(45) Date of Patent: Jan. 31, 2017

(54) DEVICE FOR DETERMINING THE POSITION OF A MAGNETIC ELEMENT USING LINEAR HALL-EFFECT CELLS

(75) Inventor: Eric Servel, Roques (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 941 days.

(21) Appl. No.: 13/883,079

(22) PCT Filed: Aug. 18, 2011

(86) PCT No.: PCT/EP2011/004168
§ 371 (c)(1),
(2), (4) Date: May 30, 2013

(87) PCT Pub. No.: WO2012/059149
PCT Pub. Date: May 10, 2012

(65) Prior Publication Data
US 2013/0245992 A1  Sep. 19, 2013

(30) Foreign Application Priority Data

Nov. 4, 2010 (FR) ..................................... 10 04334

(51) Int. Cl.
*G01C 9/00* (2006.01)
*G01B 7/14* (2006.01)
(Continued)

(52) U.S. Cl.
CPC ................. *G01B 7/14* (2013.01); *G01D 5/145* (2013.01); *F16H 59/70* (2013.01)

(58) Field of Classification Search
CPC ............ G01B 7/14; G01D 5/145; F16H 59/70
(Continued)

(56) References Cited

U.S. PATENT DOCUMENTS

| 7,408,343 B2 | 8/2008 | Dmytriw |
| 7,508,196 B2 | 3/2009 | Oohashi et al. |

(Continued)

FOREIGN PATENT DOCUMENTS

| CN | 201021714 | 2/2008 |
| EP | 0591113 | 4/1994 |

(Continued)

OTHER PUBLICATIONS

International Search Report dated Nov. 28, 2011, corresponding to PCT/EP2011/004168.

*Primary Examiner* — An Do
(74) *Attorney, Agent, or Firm* — Young & Thompson (57) ABSTRACT

A device for determining the position of a magnetic element (50), the magnetic element being able to be moved in at least two directions relative to a longitudinal axis (A), a first direction (Z) and a second direction (X). The device includes: a position sensor (60) including two sets of two Hall-effect cells measuring the same magnetic field generated by the magnetic element, a first set along a first axis (B) substantially perpendicular the longitudinal axis (A), and a second set along a second axis (C) substantially parallel to the first axis (B), the magnetic element being moveable relative to the position sensor; first unit (91) for calculating the position of the magnetic element in the main direction (Z); and second unit (92) for calculating the position of the magnetic element in the secondary direction (X).

14 Claims, 4 Drawing Sheets

(51) Int. Cl.
  *G01D 5/14* (2006.01)
  *F16H 59/70* (2006.01)
(58) Field of Classification Search
  USPC ............... 702/127, 150, 155, 158; 324/207.2
  See application file for complete search history.

(56) References Cited

U.S. PATENT DOCUMENTS

| | | | |
|---|---|---|---|
| 7,800,356 B2* | 9/2010 | Takeya | G01D 5/145 |
| | | | 324/207.21 |
| 8,963,540 B2* | 2/2015 | Reymond | G01D 5/145 |
| | | | 324/207.11 |
| 9,322,671 B2* | 4/2016 | Servel | F16H 59/70 |
| 2005/0258825 A1 | 11/2005 | Matsuda et al. | |
| 2006/0065068 A1 | 3/2006 | Mizuno et al. | |

FOREIGN PATENT DOCUMENTS

| | | |
|---|---|---|
| EP | 0800055 | 10/1997 |
| EP | 1055914 | 11/2000 |
| FR | 2581002 | 10/1986 |
| FR | 2 738 608 | 3/1997 |
| FR | 2 926 881 | 7/2009 |
| GB | 2214248 | 8/1989 |
| JP | H08312766 | 11/1996 |
| JP | 2006-276983 | 10/2006 |
| WO | 97/46815 | 5/1997 |
| WO | 97/46815 | 12/1997 |

* cited by examiner

Fig 7

DEVICE FOR DETERMINING THE POSITION OF A MAGNETIC ELEMENT USING LINEAR HALL-EFFECT CELLS

The present invention relates to a device for determining the position of a magnetic element using linear Hall-effect position sensors. The invention also relates to a method associated with this device.

More particularly, the invention relates to the detection of the position of a gearbox selector of an automotive vehicle and allows the gear ratio that is selected by the driver to be anticipated.

The selection of a gear ratio for an automotive vehicle is generally achieved, for a manual gearbox, via a gear lever located in the passenger compartment of the vehicle and which, via a rod linkage transmission system connected to a selection axis of the gearbox ratio, allows, via various systems of gears known to those skilled in the art and not described in detail here, a gear ratio of the gearbox to be selected. The latter is generally located under the vehicle and is connected to the wheels and to the engine.

The gear lever can move in two perpendicular directions. In this example, discussion will be limited to the case of a gearbox comprising six gear ratios: 1st, 2nd, 3rd, 4th, 5th and reverse R (cf. FIG. 2). The expression "gear of the vehicle" will be understood to mean the gear ratio engaged in the gearbox and "neutral" N, zero gear ratio. The movement of the gear lever is transmitted to the gearbox, to the gear ratio selection axis, also called the gear ratio selector, which selector moves in translation along a longitudinal axis and in rotation about this longitudinal axis of the gearbox. By way of various mechanical transmission systems, this movement in translation and rotation of the gear ratio selector allows the gear ratio chosen by the driver to be engaged.

In order for the vehicle to carry out some operations, for example in order to turn off the engine when the gearbox is in neutral in order to reduce polluting exhaust emissions, it is common to use a device comprising a position sensor of the gear ratio selector. This position sensor generally comprises a linear Hall-effect cell, connected to an integrated electronic circuit. The expression "linear Hall-effect cell" will be understood to mean an element made of a conductor or semiconductor through which a current flows, this element being subjected to a magnetic field perpendicular to the current, thereby producing an output voltage that is proportional to the magnetic field and to the current flowing through said cell. The measurement plane of the Hall-effect cell is perpendicular to the magnetic field emitted by the magnetic element. In the rest of the description "Hall-effect cell" will be understood to mean "linear Hall-effect cell".

Figure 1:
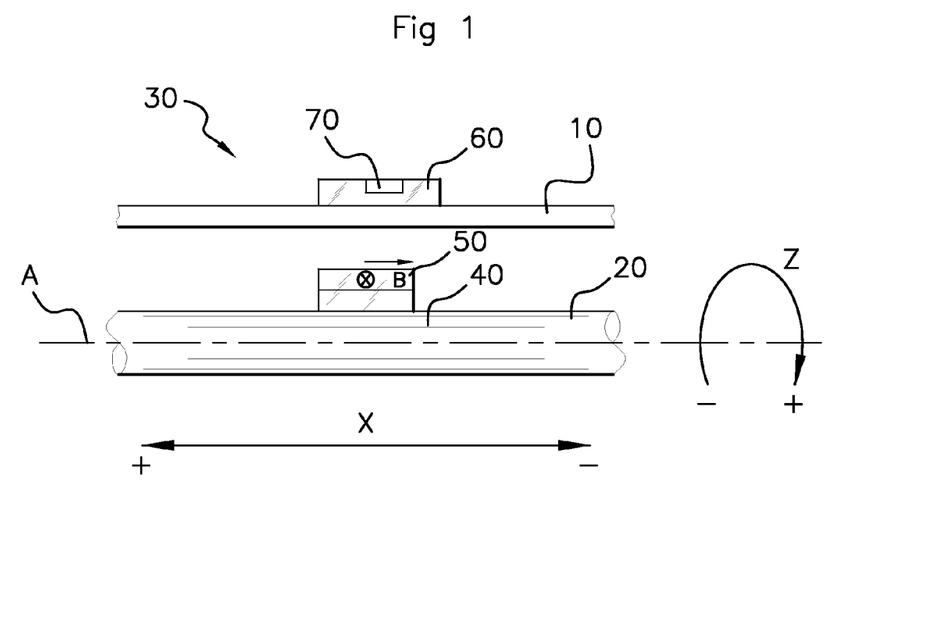
FIG. 1, referenced above, shows a partial schematic view of a gearbox equipped with a prior-art position sensor.

As illustrated in FIG. 1, the position sensor 60 is generally located on the housing 10 of the gearbox 30, opposite a magnetic element 50 located on the gear ratio selector 20 (via a holder 40) which moves, during the gear ratio selection, in rotation, in a main direction Z, and in translation in a secondary direction X, relative to a longitudinal axis A of the selector 20. The magnetic element 50 is oriented in such a way that it creates a magnetic field $\vec{B}$ that varies with the movement direction of the gear ratio selector 20 which we wish to detect. In FIG. 1, the magnetic field $\vec{B}$ is oriented perpendicularly to the longitudinal axis A, and transversely relative to the gear ratio selector 20, this in order to measure the movement in rotation in the main direction Z of the gear ratio selector 20. The orientation of the magnetic field $\vec{B}$ is illustrated more clearly in FIG. 2, which shows a top view of FIG. 1. The magnetic field $\vec{B}$ therein is oriented along a transverse axis B of the gearbox 30. A Hall-effect cell 70 detects variations in the magnetic field $\vec{B}$ induced by the movement in translation or rotation (as in the example illustrated in FIG. 1) of the magnetic element 50 and thus determines the position of the gear ratio selector 20.

However, this detection can only occur in one movement direction of the gear ratio selector 20, the Hall-effect cell 70 being sensitive only in one direction of the magnetic field $\vec{B}$ emitted by the magnetic element 50. In order to detect when the gear lever 80 is, for example, in neutral N, the Hall-effect cell 70 and the magnetic element 50 are positioned in order to determine the position in rotation, in the main direction Z, of the gear ratio selector 20. As explained above, and as illustrated in FIG. 2, the magnetic field $\vec{B}$ created by the magnetic element 50 and detected by the position sensor 60 is oriented along the transverse axis B of the gearbox 30. If the gear ratio selector 20 turns in the positive direction, in the main direction Z, it means that an even gear (2nd, 4th) or reverse R is selected by the gearbox 80. If it turns in the opposite direction, i.e. the negative direction, one of the uneven gears (1st, 3rd or 5th) is selected, and finally, if it is centered on the longitudinal axis A, then the gear lever 80 is considered to be in neutral.

Figure 2:
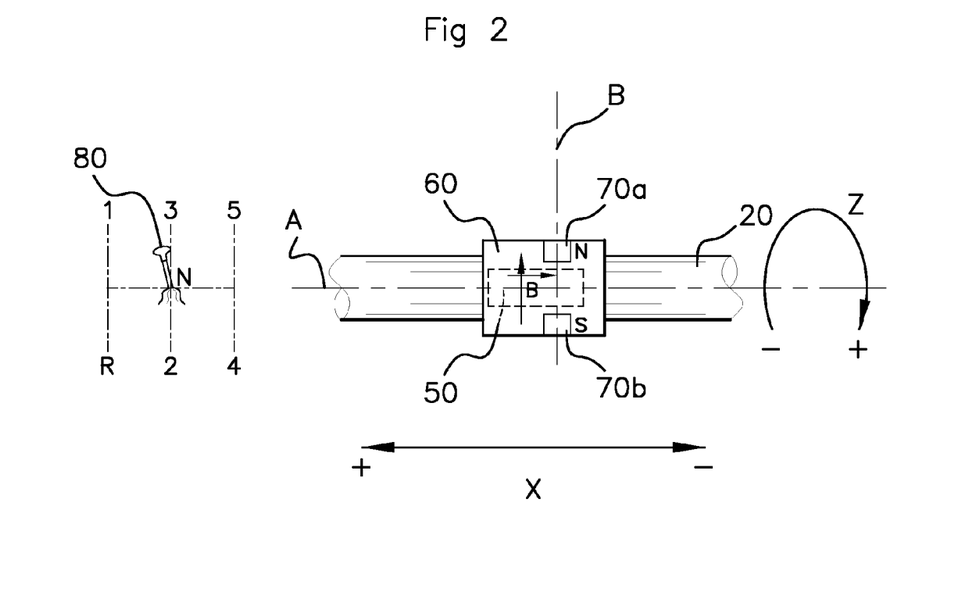
FIG. 2, referenced above, shows a partial schematic top view of a gear box equipped with the position sensor of FIG. 1.

As illustrated in FIG. 2, in order to overcome drifts in the magnetic element, and variations in the distance separating the magnetic element from the position sensor 60, it is common to use a ratiometric ratio between the output voltages of two Hall-effect cells 70a and 70b, said cells being contained in a single position sensor 60. These Hall-effect cells 70a and 70b are located in the same measurement plane, i.e. they are coplanar in a plane determined by the longitudinal axis A and the transverse axis B, and they measure the same magnetic field $\vec{B}$. Specifically, by using a ratiometric ratio between the output voltages of two Hall cells 70a, 70b, this impact is cancelled out. This method is, for example, described in patent application FR 2 926 881. In this patent application FR 2 926 881, the arctangent of the ratiometric ratio between the output voltages of two Hall cells is used in order to detect the position of the gear ratio selector 20 in rotation, independently therefore of some variations.

At the present time detection in a single movement direction is unsatisfactory, and it would be useful to be able to precisely detect the gear ratio selected in order to improve the performance of the vehicle (noise, emissions) by anticipating, for example, a gear ratio change. It therefore becomes necessary to be able to detect not only the type of gear ratio selected (even, uneven, neutral), but also the gear ratio per se and therefore to detect the movement of the gear ratio selector 20 in both movement directions, in rotation and in translation, relative to the longitudinal axis A of the gearbox.

Figure 3:
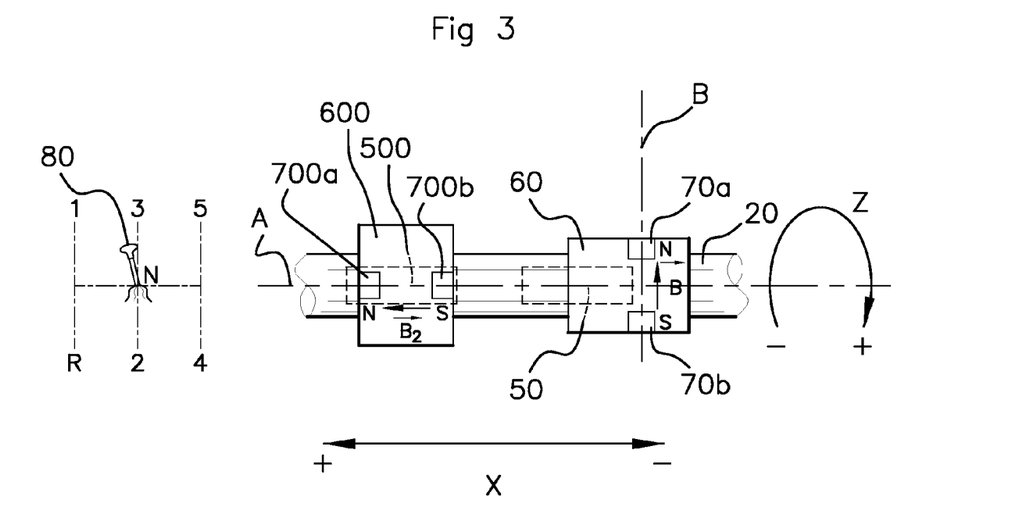
FIG. 3, referenced above, shows a partial schematic view of a gearbox equipped with two prior-art position sensors.

To do this, it is conventional to add (cf. FIG. 3) to the device an additional magnetic element 500 on the gear ratio selector 20, oriented in such a way that it creates a magnetic field $\vec{B}_2$ in the second movement direction or secondary direction X that we wish to detect (in our example, the translation), and a position sensor 600 located opposite said additional magnetic element (for example on the housing 10 of the gearbox 30, not shown in FIG. 3) and comprising one or two Hall cells 700a and 700b. The latter are located in the same measurement plane and oriented so as to measure this second magnetic field $\vec{B}_2$. These two Hall-effect cells 700a and 700b thus each produce an output voltage proportional to the movement of the gear ratio selector 20, in this case, in translation, in the positive direction of the secondary direction X. A configuration employing a single Hall-effect cell per position sensor is described in patent application WO 97 46 815.

The use of a device comprising two magnetic elements 50 and 500 and two position sensors 60 and 600 (each comprising one or two Hall-effect cells) thus makes it possible to detect the movement of the gear ratio selector in two directions, in rotation and in translation, and thus to determine the gear ratio selected by the user via the gear lever.

However, this device has the drawback of requiring two position sensors, each associated with a magnetic element. This device therefore proves to be very disadvantageous in terms of cost and in terms of size.

The invention therefore proposes to overcome this drawback by providing a device that requires only a single magnetic element, while keeping the same accuracy regarding the position of the gear ratio selector, in both directions.

One subject of the present invention is a device for determining the position of a magnetic element, said magnetic element being able to be moved in at least two directions relative to a longitudinal axis, a first direction, called the main direction, and a second direction, called the secondary direction. The device comprises:
  two sets of two Hall-effect cells measuring the same magnetic field generated by the magnetic element, a first set comprising a first cell and a second cell along a first axis substantially perpendicular to the longitudinal axis, and a second set comprising a third cell and a fourth cell along a second axis substantially parallel to the first axis, the magnetic element being moveable relative to said two sets of two Hall-effect cells;
  means for measuring voltages output by each Hall-effect cell;
  first means for calculating the position of the magnetic element in the main direction; and
  second means for calculating the position of the magnetic element in the secondary direction.

In one embodiment of the device, said device comprises two contiguous position sensors each comprising a set of two Hall-effect cells.

In one preferred embodiment of the device, said device comprises a position sensor comprising the two sets of two Hall-effect cells.

The position sensor is advantageously placed in the magnetic field created by the magnetic element and is located opposite said magnetic element. The position sensor comprises four Hall-effect cells each delivering an output voltage that is proportional to the magnitude of the magnetic field created by the magnetic element.

According to particular embodiments, the device comprises one or more of the following features, whether alone or in any technically possible combination:
  the Hall-effect cells are linear Hall-effect cells;
  the Hall-effect cells are substantially identical to one another;
  the Hall-effect cells are coplanar;
  the Hall-effect cells are oriented in the same direction; and/or
  the magnetic element is a simple magnet, i.e. it is not a multipolar magnet.

In one embodiment, the first and second calculating means are separate means.

In a preferred embodiment, the first and second calculating means are advantageously the same means.

In one embodiment, the measuring means are separate means, one for each Hall-effect cell.

In a preferred embodiment, the measuring means are advantageously common to the four Hall-effect cells.

In one embodiment of the invention, the main direction is that of the rotation of the magnetic element about the longitudinal axis and the secondary direction is that of the translation of the magnetic element along the longitudinal axis.

In another embodiment of the invention, the main direction is that of the translation of the magnetic element along the longitudinal axis and the secondary direction is that of the rotation of the magnetic element about the longitudinal axis.

In one preferred embodiment, the device allows the rotation and the translation of the selector of a gearbox of an automotive vehicle to be detected. In such an embodiment, the magnetic element is placed on the gear ratio selector which axis longitudinal.

Preferably, the measuring means are means, already fitted to the vehicle, able to measure voltages across the terminals of the Hall-effect cells.

The first and second calculating means, which are optionally a common means, comprise at least one computer able to calculate the position of the magnetic element from the voltages obtained as output from the Hall-effect cells by the measuring means. The computer may be, in one particular embodiment, a computer of the vehicle, this computer also carrying out other functions.

In a first embodiment, and in a typical gearbox configuration for a front-wheel drive vehicle, the main movement direction is that of the rotation of the gear ratio selector about the longitudinal axis, and the secondary direction is the translation of the gear ratio selector along the longitudinal direction.

In a second embodiment, and in a typical gearbox configuration for a rear-wheel drive vehicle, the main movement direction is that of the translation of the gear ratio selector along the longitudinal axis, and the secondary direction is that of the rotation of the gear ratio selector about the longitudinal axis.

The invention also relates to a method for determining the position of a magnetic element using a device such as described. Said method comprises steps of:
  measuring a voltage output by each Hall-effect cell using the measuring means;
  calculating, using the second calculating means, a value P depending on four measured voltages $V_1, V_2, V_3, V_4$, where $V_1$ is the voltage across the terminals of the first cell, $V_2$ the voltage across the terminals of the second cell, $V_3$ the voltage across the terminals of the third cell, and $V_4$ the voltage across the terminals of the fourth cell; and
  determining the position of the magnetic element in the secondary direction using the calculated value P.

In one embodiment of the method, the value P is calculated from a geometric mean $\sqrt{V_1^2+V_2^2}$, $\sqrt{V_3^2+V_4^2}$ between two voltages for each of the two sets of two Hall-effect cells.

In one embodiment of the method, the value P is calculated such that it equals:
  either a ratiometric ratio $P_1$ given by $$P_1 = \frac{\sqrt{V_1^2 + V_2^2}}{k\sqrt{V_1^2 + V_2^2} + \sqrt{V_3^2 + V_4^2}},$$

where k is a preset constant;
or a ratiometric ratio $P_2$ given by $$P_2 = \frac{\sqrt{V_3^2 + V_4^2}}{k\sqrt{V_3^2 + V_4^2} + \sqrt{V_1^2 + V_2^2}},$$

the choice of the ratiometric ratio depending on the result of a comparison between the two geometric means.

The preset constant k allows the accuracy of the device to be adjusted. This adjustment allows the user to take into account tolerances due to, inter alia, the calibration of the magnetic element (size, position) or even due to differences in the relative position of the position sensor and the magnetic element or even tolerances in the measurements made by the Hall-effect cells.

In a simplified embodiment of the method, setting k=0, the value P is calculated such that it is equal to $$P_1 = \frac{\sqrt{V_1^2 + V_2^2}}{\sqrt{V_3^2 + V_4^2}}, \text{ or to } P_2 = \frac{\sqrt{V_3^2 + V_4^2}}{\sqrt{V_1^2 + V_2^2}},$$

depending on the result of the comparison between the two geometric means.

For example, the value P is chosen such that:

$P = P_1$ when $\sqrt{V_1^2 + V_2^2} \leq \sqrt{V_3^2 + V_4^2}$;

$P = 2 - P_1$ when $\sqrt{V_1^2 + V_2^2} \geq \sqrt{V_3^2 + V_4^2}$.

In a particular embodiment of the method, in order to obtain a more precise determination of the position of the magnetic element, the method comprises a preliminary step of calibrating the value of at least one of the following elements:

size of the magnetic element;
distance separating, on the longitudinal axis, the two sets, depending on a relationship describing the variation in the geometric mean of each set, said geometric means themselves depending on the position of the magnetic element relative to said sets.

Advantageously, the method comprises an additional step of determining the position of the magnetic element in the main direction by calculating an arctangent between the first voltage $V_1$ and the second voltage $V_2$ and/or an arctangent between the third voltage $V_3$ and the fourth voltage $V_4$.

The double arctangent calculation between the first voltage $V_1$ and the second voltage $V_2$ and between the third voltage $V_3$ and the fourth voltage $V_4$ makes it possible to create a redundancy in the information regarding the position of the magnetic element in the main direction.

By implementing the method with this additional step, it is therefore possible to determine with precision the position of the magnetic element moving in two directions, the main direction and the secondary direction.

The method makes it possible, in a nonrestrictive manner, to detect the rotation and the translation of a gearbox selector of an automotive vehicle, the magnetic element being placed on the gearbox selector which axis is longitudinal.

The invention will now be described in more detail by way of preferred embodiments that in no way limit the scope of the invention, shown in FIGS. 1 to 7, in which.

Figure 4:
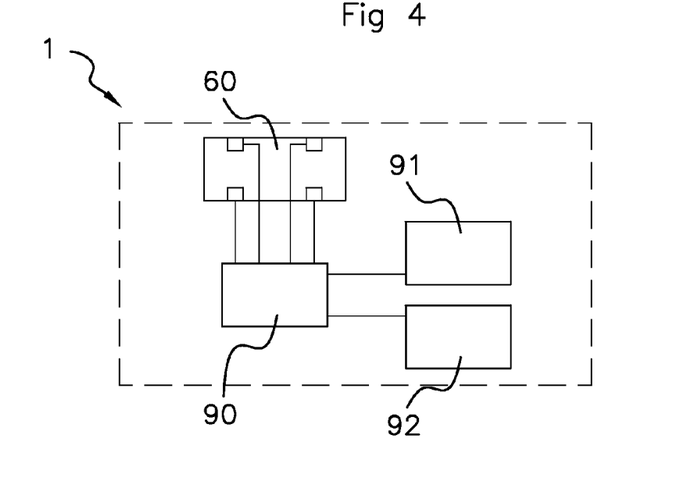
FIG. 4, shows a diagram of a device for determining the position of a magnetic element placed on a gearbox selector, according to the invention.

A device 1 for determining the position of a magnetic element 50 located on the selector 20 of a gearbox of an automotive vehicle is illustrated in FIG. 4.

The device 1 is illustrated and described, in a nonrestrictive manner, in the context of a magnetic element 50 located on the selector 20 of a gearbox of a front-wheel drive automotive vehicle. This choice is nonlimiting and the device can also be used to determine the position of a magnetic element 50 located on the selector of a gearbox of a rear-wheel drive automotive vehicle.

Thus, in the case of a front-wheel drive automotive vehicle, the magnetic element 50 moves, during a gear ratio selection by a user of the vehicle, in rotation in a main direction Z, and in translation in a secondary direction X, relative to the longitudinal axis A of the selector of the gearbox.

Figure 5:
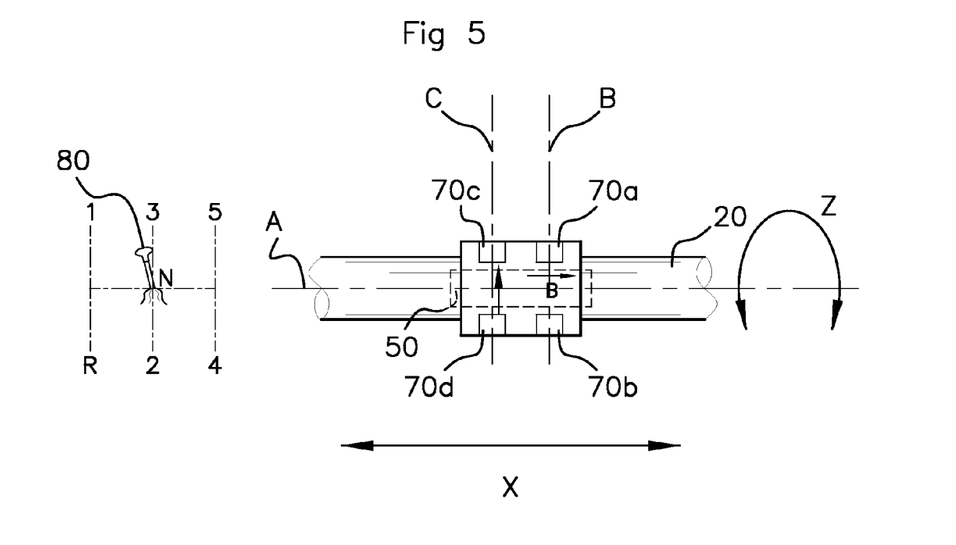
FIG. 5 shows a partial schematic view of a gearbox equipped with a position sensor according to the invention.

The device is described for a gearbox comprising six gear ratios (five speeds and one reverse), such as illustrated in FIG. 5.

Although the number of gear ratios illustrated in FIG. 5 and described is six, the number of these gears is not limited to the number described and illustrated. Thus, it is possible, without departing from the scope of the invention, to use the device for a gearbox comprising more or less than six gear ratios.

The device 1 comprises a position sensor 60 generally located on the housing of the gearbox 30, opposite the magnetic element 50.

The position sensor 60, as illustrated in FIG. 5, comprises two sets of two Hall-effect cells:

a first set comprising a first cell 70a and a second cell 70b; and a second set comprising a third cell 70c and a fourth cell 70d.

Each Hall-effect cell 70a, 70b, 70c, 70d delivers an output voltage $V_1, V_2, V_3, V_4$, respectively, that is proportional to the magnitude of the magnetic field $\vec{B}$ created by the magnetic element 50.

According to a preferred embodiment, the Hall-effect cells are coplanar and are positioned in such a way that:

the two cells 70a, 70b of the first set are aligned on a first axis, called the first transverse axis B, substantially perpendicular to the longitudinal axis A of the gear ratio selector 20;

the two cells 70c, 70d of the second set are aligned on a second axis, called the second transverse axis C, substantially parallel to the first transverse axis B.

The two sets of two cells are offset by a few millimeters along the longitudinal axis A, for example about eight millimeters.

The device 1 furthermore comprises (cf. FIG. 4):

means 90 for measuring voltages output by each Hall-effect cell;

first means 91 for calculating the position of the magnetic element 50 in the main direction Z from the voltages produced by the Hall-effect cells; and second means 92 for calculating the position of the magnetic element 50 in the secondary direction X from the voltages produced by the Hall-effect cells.

In one embodiment, the measuring means 90 are able to measure the voltages across the terminals of each Hall-effect cell 70a to 70d.

The first calculating means 91 are able to calculate the position of the magnetic element in the main direction Z, from the measurements of the voltages output by each Hall-effect cell.

Advantageously, the measuring means 90, for measuring the voltages, are shared means performing measurements for other functions of the vehicle and may be incorporated in a microcontroller.

In a particular embodiment, the first and second calculating means 91, 92, for calculating the position of the magnetic element 50, are shared means performing calculations for other functions of the vehicle and may be incorporated in the same microcontroller as that used by the measuring means 90.

In a first embodiment, in order to determine the position of the magnetic element 50 in rotation, and therefore the position of the selector 20, the first calculating means 91 calculate the arctangent of the ratio of the first voltage $V_1$ to the second voltage $V_2$ originating from the first set of Hall-effect cells 70a and 70b. This calculation is known in the art.

Figure 6:
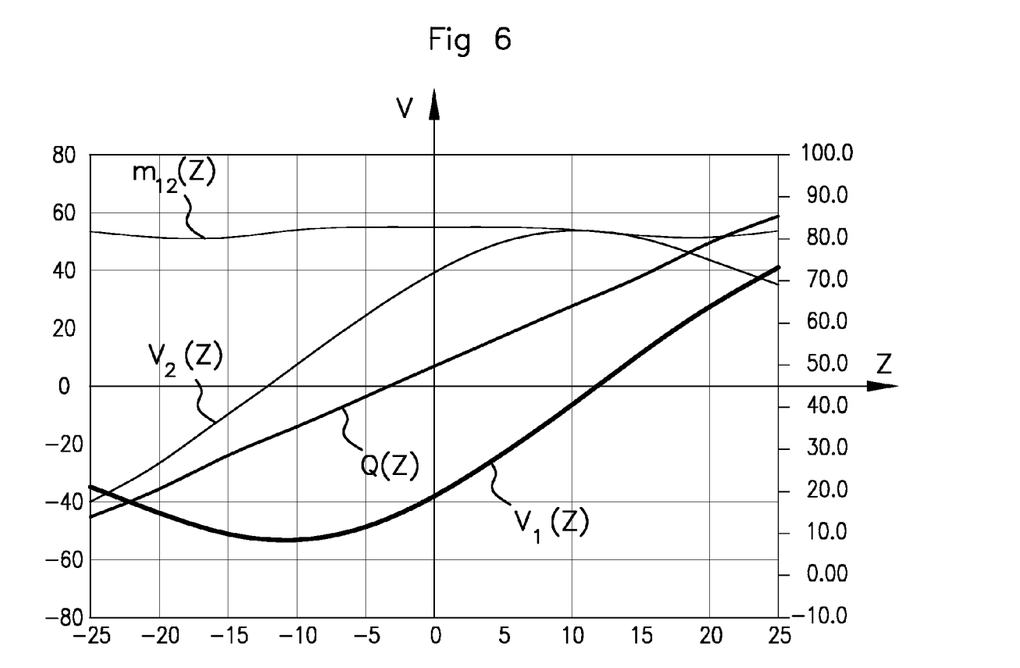
FIGS. 6 and 7 show graphical representations of measurements of the position of the gear ratio selector according to the invention.

FIG. 6 illustrates curves $V_1(Z)$, $V_2(Z)$ and $$Q(Z) = \arctan\left(\frac{V_1 Z}{V_2 Z}\right)$$

that are functions of the movement (expressed in degrees) of the magnetic element 50, and therefore of the gear ratio selector 20, in rotation in the main direction Z over the maximum range of movement.

As illustrated in FIG. 6, the curves $V_1(Z)$ and $V_2(Z)$ take the form of sinusoids that are out of phase relative to each other, and the curve $Q(Z)$ is substantially a straight line, the values of which are proportional to the movement in rotation of the magnetic element 50, in the main direction Z.

Thus, depending on the value of Q calculated by the first calculating means 91, it is possible to determine the movement in rotation of the magnetic element 50, and therefore of the selector 20, in the main direction Z.

In another embodiment, the first calculating means 91 calculate the arctangent of the ratio of the voltage $V_3$ to the voltage $V_4$ of the second set of Hall-effect cells 70c and 70d, in order to determine the movement in rotation of the magnetic element 50, and therefore of the selector 20, in the main direction Z.

In another embodiment, in order to obtain a redundancy in the information delivered, the first calculating means 91 calculate the arctangent of the ratio of the first voltage $V_1$ to the second voltage $V_2$ and the arctangent of the ratio of the voltage $V_3$ to the voltage $V_4$ of the second set in order to determine the movement in rotation of the magnetic element 50, and therefore of the selector 20, in the main direction Z.

In a second embodiment, in order to determine the position of the magnetic element in translation, and therefore the position of the selector, the second calculating means 92 calculate, in a first step, geometric means of the voltages of the two Hall-effect cells of each set.

This is because, offsetting the two sets of two cells by a few millimeters makes it possible to create a variation between their geometric means that is sufficient to determine the position in translation of the magnetic element, and therefore of the selector 20.

For the first set, the geometric mean $m_{12} \leq \sqrt{V_1^2 + V_2^2}$ is the geometric mean of the voltages of the two Hall-effect cells 70a, 70b, i.e. originating from the first set of Hall-effect cells.

For the second set, the geometric mean $m_{34} \leq \sqrt{V_3^2 + V_4^2}$ is the geometric mean of the voltages of the two Hall-effect cells 70c, 70d, i.e. originating from the 2nd set of Hall-effect cells.

As illustrated in FIG. 6, the curve $m_{12}(Z)$ shows that the geometric mean $m_{12}$ is practically insensitive to the movement of the magnetic element 50 in rotation in the main direction Z.

The curve $m_{34}(Z)$, although not shown in FIG. 6 so as not to clutter it, also illustrates that the geometric mean $m_{34}$ is practically insensitive to the movement of the magnetic element 50 in rotation in the main direction Z.

This means that detection along the translation axis X is insensitive to the position in rotation, along the axis of rotation Z, of the gear ratio selector 20, or in other words that the device according to the invention not only allows the gear ratio engaged (1st, 2nd, 3rd, 4th, 5th, or reverse) to be determined precisely but also allows the movement of the gear ratio selector 20 during a gear ratio change to be detected. The invention thus makes it possible to know whether the driver is in the process of changing to a higher or lower gear ratio. This anticipation makes it possible, inter alia, to better manage the electronic operation of the engine (better management of the fuel supply during these phases for example).

The second calculating means 92 then calculate a value P that is equal to:

either a ratiometric ratio $P_1$ given by $$P_1 = \frac{m_{12}}{k \cdot m_{12} + m_{34}},$$

where k is a preset constant;

or a ratiometric ratio $P_2$ given by $$P_2 = \frac{m_{34}}{k \cdot m_{34} + m_{12}}.$$

The ratiometric ratio $P_1$ or $P_2$ to be chosen depends on the result of a comparison between the two geometric means.

The constant k allows the accuracy of the device to be adjusted. This adjustment allows the user to take into account the tolerances in the calibration of the magnetic element 50 (size, position), differences in the relative position of the position sensor and the magnetic element, or even tolerances in the measurements made by the Hall-effect cells.

The ratiometric ratios $P_1$ or $P_2$ may be simplified by setting k=0. Thus the value P is calculated, depending on the result of the comparison between the two geometric means, to be either $$P_1 = \frac{m_{12}}{m_{34}} \text{ or } P_2 = \frac{m_{34}}{m_{12}}.$$

In one embodiment, the value P is equal to:

$P=P_1$ when $m_{12} \leq m_{34}$; and $P=2-P_2$ when $m_{12} \geq m_{34}$.

Figure 7:
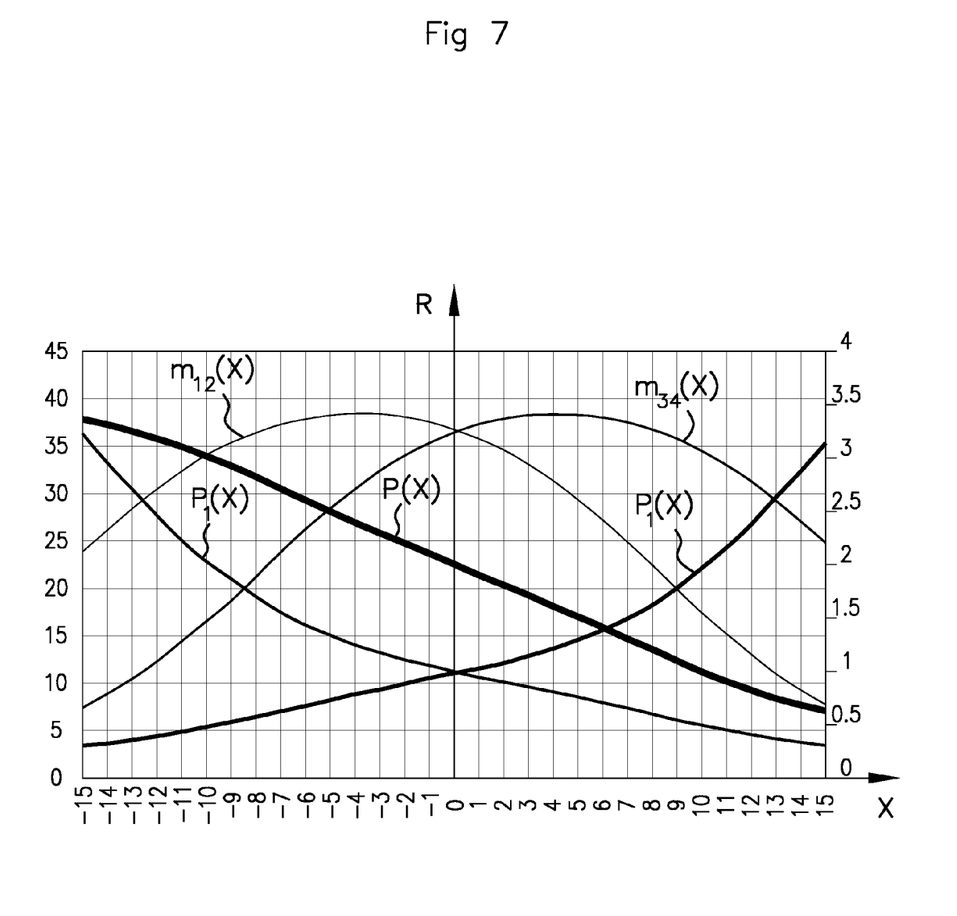

FIG. 7 illustrates the curves $m_{12}(X)$, $m_{34}(X)$, $P_1(X)$, $P_2(X)$ and P(X) as a function of the movement of the magnetic element 50, and therefore of the gear ratio selector 20, in translation over the maximum range of movement.

FIG. 7 shows that the curve P(X) obtained from the preceding choice is comparable to a straight line, the values of which are proportional to the movement of the magnetic element 50 in translation along the secondary direction Z. For the sake of clarity, in FIG. 7, and so that the curve $P_1(X)$ does not overlap the part of the curve $P_1(X)$ where $m_{12}(X) \leq m_{34}(X)$, the values of the curve P(X) have been multiplied by a factor of two.

Thus, depending on the value of P calculated by the second calculating means 92, it is possible to determine the movement of the magnetic element 50, and therefore of the selector, in translation along the secondary direction X.

The use of two Hall-effect cells 70c, 70d in the same position sensor 60 used to determine the movement in rotation of the gear ratio selector 20 thus also makes it possible to determine the movement in translation of the gear ratio selector 20.

Advantageously, the geometric means $m_{12}$, $m_{34}$ are linearized in order to prevent fluctuations in the values of the ratiometric ratios $P_1$ and $P_2$ that could occur due to rotation of the magnetic element, and in order to obtain a value P that is better correlated to the values of the ratiometric ratios $P_1$ and $P_2$ and the values of the movement of the gear ratio selector. This linearization may be achieved simply, for example, by using a moving average or a correction table.

In an improved embodiment of the invention, in order to decrease the influence of the position of the magnetic element 50 with respect to the position sensor 60 and the location of the Hall-effect cells 70a, 70b, 70c, 70d in said sensor, on the accuracy with which the movement in translation of the gear ratio selector 20 along the secondary direction X is determined, each of the following elements is calibrated before the ratiometric ratios $P_1$ and $P_2$ are calculated:

size of the magnetic element 50;
distance separating, on the longitudinal axis, the Hall-effect cells of the two sets;
orientation, along the axis A and B, of each of
the Hall-effect cells 70a, 70b, 70c, 70d, depending on a relationship describing the variation in the output voltage measured for each Hall-effect cell 70a, 70b, 70c, 70d, this relationship itself depending on the position of the magnetic element 50 relative to said Hall-effect cell.

This calibration thus allows the user to obtain the desired accuracy.

Preferably, to simplify the aforementioned calibration, the Hall-effect cells are all substantially identical to one another. A correction may be necessary in order to make them identical.

A method for determining the position of the magnetic element 50 in translation and in rotation, associated with the device, thus comprises, inter alia, steps of:

measuring a voltage output by each Hall-effect cell using the measuring means 90;

calculating, using the first calculating means 91, a value Q depending on two of the four measured voltages $V_1, V_2$, or $V_3, V_4$, and determining the position of the magnetic element 50 in the secondary direction using the calculated value Q; and calculating, using the second calculating means 92, a value P depending on the four measured voltages and determining the position of the magnetic element 50 in the secondary direction using the calculated value P.

The device and the associated method, according to the invention, therefore allow the position of a magnetic element 50, located on a gearbox selector 20 of an automotive vehicle, to be determined in rotation and in translation.

It is possible, thanks to the device, to anticipate what the user is doing, mainly in order to adjust the engine speed, and thus to reduce polluting emissions. For example, certain operations such as, for example, turning off the engine when the gearbox is in neutral, are easily achievable.

Advantageously, the device makes it possible, inter alia, to determine whether the reverse gear R is engaged. It therefore makes it possible to remove a specific sensor that is currently used in automotive vehicles to detect reverse.

The invention is described for the case of coplanar Hall-effect cells 70a, 70b, 70c, 70d. However, the invention also applies to the case of non-coplanar Hall-effect cells.

Likewise, the arrangement of the Hall-effect cells 70a, 70b, 70c, 70d in the position sensor 60, along the longitudinal axis A and the transverse axes B and C, may be freely chosen provided that the cells measure the same magnetic field B and deliver an output voltage proportional to the magnitude of said magnetic field B.

The device and the method have been described in the context of a front-wheel drive automotive vehicle, but they are also applicable to the case of a rear-wheel drive automotive vehicle. In this case, the magnetic element 50 moves, during gear ratio selection by the user of the vehicle, in translation in the main direction Z, and in rotation in the secondary direction X.

The invention also applies to any configuration or type of gearbox (manual, automatic, semi-automatic, etc.).

The invention claimed is:

1. A method for determining the position of a magnetic element (50) using a device (1), said magnetic element (50) being able to be moved in at least two directions relative to a longitudinal axis (A), a first direction, called the main direction (Z), and a second direction, called the secondary direction (X), said device comprising:

a position sensor (60) comprising two sets of two Hall-effect cells measuring the same magnetic field generated by the magnetic element, a first set comprising a first cell (70a) and a second cell (70b) along a first axis (B) substantially perpendicular to the longitudinal axis (A), and a second set comprising a third cell (70c) and a fourth cell (70d) along a second axis (C) substantially parallel to the first axis (B), the magnetic element being moveable relative to said two sets of two Hall-effect cells;

means (90) for measuring voltages output by each Hall-effect cell;

first means (91) for calculating the position of the magnetic element in the main direction (Z); and second means (92) for calculating the position of the magnetic element in the secondary direction (X), said method being characterized in that it comprises steps of:

measuring a voltage output by each Hall-effect cell using the measuring means (90);

calculating, using the second calculating means (92), a value P calculated from a geometric mean $\sqrt{V_1^2+V_2^2}$, $\sqrt{V_3^2+V_4^2}$ depending on four measured voltages $V_1, V_2, V_3, V_4$, where $V_1$ is the voltage across the terminals of the first cell (70a), $V_2$ the voltage across the terminals of the second cell (70b), $V_3$ the voltage across the terminals of the third cell (70c), and $V_4$ the voltage across the terminals of the fourth cell (70d); and determining the position of the magnetic element (50) in the secondary direction (X) using the calculated value P.

2. The method as claimed in claim 1, in which the value P is calculated such that it equals:

either a ratiometric ratio $P_1$ given by $$P_1 = \frac{\sqrt{V_1^2+V_2^2}}{k\sqrt{V_1^2+V_2^2}+\sqrt{V_3^2+V_4^2}},$$

where k is a preset constant;

or a ratiometric ratio $P_2$ given by $$P_2 = \frac{\sqrt{V_3^2+V_4^2}}{k\sqrt{V_3^2+V_4^2}+\sqrt{V_1^2+V_2^2}},$$

the choice depending on the result of a comparison between the two geometric means.

3. The method as claimed in claim 2, in which the value P is chosen such that:

$P=P_1$ when $\sqrt{V_1^2+V_2^2} \leq \sqrt{V_3^2+V_4^2}$;

$P=2-P_1$ when $\sqrt{V_1^2+V_2^2} \geq \sqrt{V_3^2+V_4^2}$.

4. The method as claimed in claim 2, comprising a step of calibrating the value of at least one of the following elements:

size of the magnetic element (50);

distance separating, on the longitudinal axis, the two sets, depending on a relationship describing the variation in the geometric mean of each set, said geometric means themselves depending on the position of the magnetic element (50) relative to said sets.

5. The method as claimed in claim 2, comprising a step of determining the position of the magnetic element (50) in the main direction (Z) by calculating an arctangent between the first voltage $V_1$ and the second voltage $V_2$ and/or by calculating an arctangent between the third voltage $V_3$ and the fourth voltage $V_4$, using the first calculating means (91).

6. The method as claimed in claim 3, comprising a step of calibrating the value of at least one of the following elements:

size of the magnetic element (50);

distance separating, on the longitudinal axis, the two sets, depending on a relationship describing the variation in the geometric mean of each set, said geometric means themselves depending on the position of the magnetic element (50) relative to said sets.

7. The method as claimed in claim 3, comprising a step of determining the position of the magnetic element (50) in the main direction (Z) by calculating an arctangent between the first voltage $V_1$ and the second voltage $V_2$ and/or by calculating an arctangent between the third voltage $V_3$ and the fourth voltage $V_4$, using the first calculating means (91).

8. The method as claimed in claim 1, comprising a step of calibrating the value of at least one of the following elements:

size of the magnetic element (50);

distance separating, on the longitudinal axis, the two sets, depending on a relationship describing the variation in the geometric mean of each set, said geometric means themselves depending on the position of the magnetic element (50) relative to said sets.

9. The method as claimed in claim 8, comprising a step of determining the position of the magnetic element (50) in the main direction (Z) by calculating an arctangent between the first voltage $V_1$ and the second voltage $V_2$ and/or by calculating an arctangent between the third voltage $V_3$ and the fourth voltage $V_4$, using the first calculating means (91).

10. The method as claimed in claim 1, comprising a step of determining the position of the magnetic element (50) in the main direction (Z) by calculating an arctangent between the first voltage $V_1$ and the second voltage $V_2$ and/or by calculating an arctangent between the third voltage $V_3$ and the fourth voltage $V_4$, using the first calculating means (91).

11. The method as claimed in claim 10, in which the main direction (Z) is that of the rotation of the magnetic element about the longitudinal axis (A), and the secondary direction (X) is that of the translation of the magnetic element along said longitudinal axis (A).

12. The method as claimed in claim 1, in which the main direction (Z) is that of the rotation of the magnetic element about the longitudinal axis (A), and the secondary direction (X) is that of the translation of the magnetic element along said longitudinal axis (A).

13. The method according to claim 1 for detecting the rotation and translation of a gear ratio selector (20) of a gearbox (30) of an automotive vehicle, which comprises placing the magnetic element (50) on the gear ratio selector (20) of axis, the longitudinal axis (A).

14. A device (1) for determining the position of a magnetic element (50), implementing the method as claimed in claim 1, said magnetic element being able to be moved in at least two directions relative to a longitudinal axis (A), a first direction, called the main direction (Z), and a second direction, called the secondary direction (X), characterized in that the device comprises:

a position sensor comprising two sets of two Hall-effect cells measuring the same magnetic field generated by the magnetic element, a first set comprising a first cell (70a) and a second cell (70b) along a first axis (B) substantially perpendicular to the longitudinal axis (A), and a second set comprising a third cell (70c) and a fourth cell (70d) along a second axis (C) substantially parallel to the first axis (B), the magnetic element being moveable relative to said two sets of two Hall-effect cells;

means (90) for measuring voltages output by each Hall-effect cell;

first means (91) for calculating the position of the magnetic element in the main direction (Z); and second means (92) for calculating the position of the magnetic element in the secondary direction (X).

* * * * *